March 26, 1935.  A. EDELMAN ET AL  1,995,606
SPEED RESPONSIVE DEVICE
Filed Sept. 7, 1932
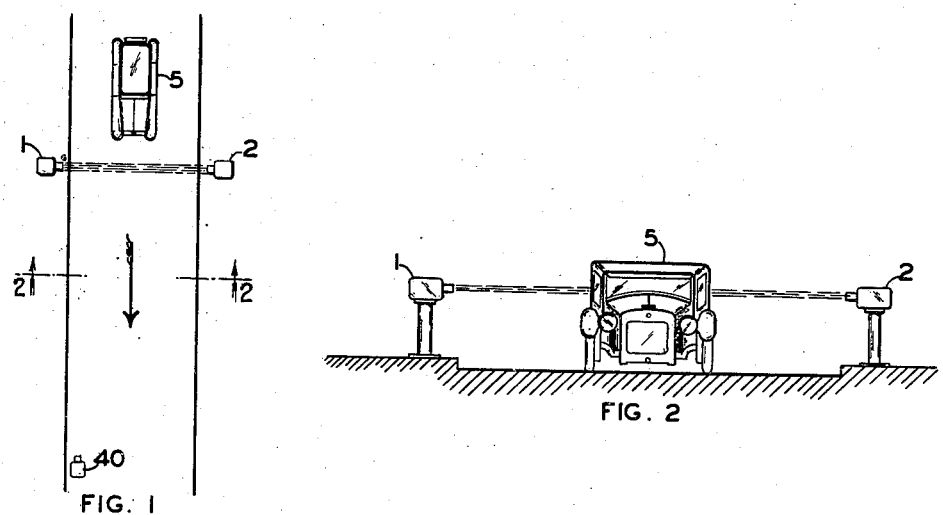
FIG. 1
FIG. 2
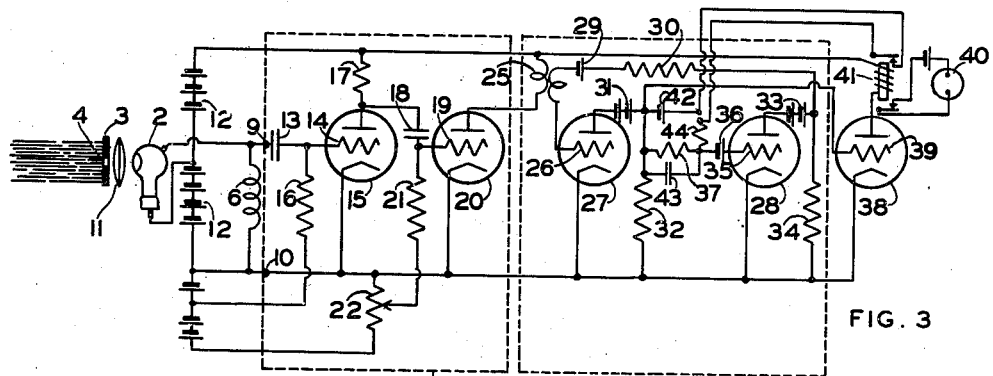
FIG. 3
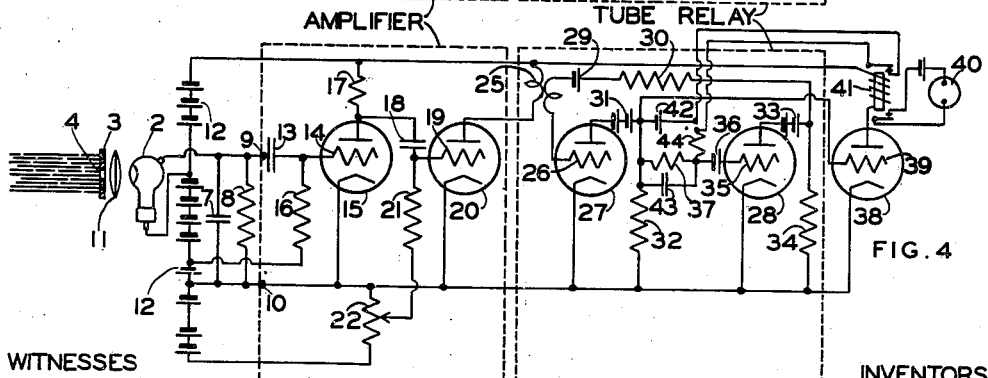
FIG. 4
WITNESSES
INVENTORS
Abraham Edelman
Clarence G. Stone
BY Kenyon & Kenyon
ATTORNEYS Patented Mar. 26, 1935

1,995,606

UNITED STATES PATENT OFFICE 1,995,606

SPEED-RESPONSIVE DEVICE

Abraham Edelman, New York, and Clarence G. Stone, Mount Vernon, N. Y.

Application September 7, 1932, Serial No. 632,004

16 Claims. (Cl. 250—41.5)

This invention relates to a new and useful speed-responsive device and has for an object an improved speed-responsive device in which a light-sensitive cell is employed instead of a mechanical connection to the moving body, and in which a practically instantaneous determination of the speed of the moving body is obtained. The moving body delivers no power to this new speed-responsive device to have its speed determined, and in most cases no advance preparation of the moving body is required. Another object of the invention is to provide a speed-responsive device adapted to automatically operate auxiliary equipment such as relays, instruments, vacuum tubes and other devices.

In a device embodying the invention, a beam of light supplied to the light-sensitive cell is arranged to be traversed by the moving body whose speed is to be determined. The arrangement of the light beam in the path of the moving body is such as to cause a change in the amount of light received by the light-sensitive cell during the time interval required for an edge of the moving body to traverse the beam. This may be accomplished in many ways; for example, the edge of an opaque or partially opaque moving body may intercept the beam; or a reflecting portion on the surface of the moving body may be caused to reflect the beam into the light-sensitive cell. In each case, however, during the time interval that the light received by the light-sensitive cell is changing, the time rate of change of light flux entering the light-sensitive cell is determined by the speed of passing of the moving body.

The light-sensitive cell may be of any type, but for convenience may be assumed to be a vacuum-type photo-electric tube, in which the current through the tube is proportional to the light flux entering the tube, and is independent of the voltage applied, within limits. The circuit of the photo-electric tube includes inductance, capacitance, resistance, or a combination of these, depending on the particular kind of speed-response desired, and the conditions of measurement.

When an inductance is used in series with the photo-electric tube, the body whose speed is to be measured may be of almost any size and shape. The light beam to be traversed by the moving body may be in the form of a flat strip of light of approximately uniform intensity throughout its cross-section at the position where the moving body intercepts it. As the front edge of the body whose speed is to be measured traverses the light beam, it decreases the light received by the photo-electric tube at an approximately constant rate which is proportional to the speed of the moving body. The current through the photo-electric tube and inductance is always proportional to the light flux entering the tube, and so decreases at a rate which is also proportional to the speed of the moving body. The voltage across the inductance is always approximately proportional to the rate of current change, and so, during the interval of time that the light is changing, there is a voltage established across the inductance, approximately proportional to the speed of passing of the moving body.

When capacitance is used in series with the photo-electric tube, it may be shunted by a high-resistance to provide the bias potential for the photo-electric tube. In this case, the moving body must be arranged with respect to the light beam in such a manner that the amount of light flux received by the photo-electric tube decreases at a rate depending on the speed of the moving body, and then increases at the same rate without much delay between decreasing and increasing; or, the light flux may first increase and then decrease, with the same limitations. These conditions are fulfilled, for example, when the moving body and the light beam are both substantially of the same width in the direction of motion. Before any action occurs, the voltage across the capacitance is steady and equal in magnitude to the drop across its shunt resistance. If the moving body now intercept the light beam and cause it to decrease at a rate depending on the speed of the body, the current through the photo-electric tube will decrease in a similar manner, and the current through the shunt resistance will tend to decrease. However, the charge on the capacitance will act to prevent the current through the shunt resistance from changing too rapidly by reinforcing the decreasing current; the voltage across the condenser will, therefore, decrease, slowly at first and then at a faster rate. If now the light flux entering the photo-electric tube begins to increase at the same rate with which it was decreasing, the voltage across the capacitance also begins to increase, but at a slower rate. The minimum value of voltage occurring across the capacitance is then a measure of the speed of passing of the moving body. In this case, low speeds produce larger voltages across the capacitance than do high speeds.

By using a combination of inductance, capacitance and resistance, many different types of speed-response may be obtained, suitable for special applications and for special ranges of speed measurement.

Other objects, novel features and advantages of this invention will be apparent from the following specification and accompanying drawing, wherein:

Fig. 1 is a view illustrating one use of the invention;

Fig. 2 is a section on the line 2—2 of Fig. 1;

Fig. 3 is a circuit diagram, and

Fig. 4 is a circuit diagram of a modification.

This invention is specifically disclosed in an apparatus for use to distinguish between bodies traveling above a predetermined speed and bodies traveling below such speed. Such apparatus may be used, for example, to pick out automobiles traveling at a speed in excess of a predetermined speed. When thus used, a beam of light is directed from a source 1 in Fig. 1, across the road along which automobiles are traveling and is directed at the photo-electric cell 2. In front of the photo-electric cell 2 there is provided a diaphragm 3 (Fig. 3) having a horizontal slit 4 and a lens 11. As the edge of an automobile 5 traverses the beam, it decreases the light received by the photo-electric cell at a rate depending on the speed of the automobile. During this time interval, therefore, the current through the photo-electric cell 2 and through an inductance 6 in series with the photo-electric cell decreases at a rate depending on the speed of the automobile. As previously described, this establishes a voltage across the inductance 6 during this interval, approximately proportional in magnitude to the rate of current change and therefore also approximately proportional to the speed of the automobile.

This voltage impulse is impressed, through the condenser 13 upon the control electrode 14 of the first tube 15 of a two-tube amplifier, the control electrode being negatively biased through the resistance leak 16 by the battery 12. Space current for the tube 15 is supplied from the battery 12 and the output of the tube circuit includes a resistance 17. The alternating current component of the output of the tube 15 is impressed through the condenser 18 upon the control electrode 19 of the second tube 20 of the amplifier, this control electrode being negatively biased through the resistance leak 21 by the potentiometer 22. Space current for the tube 20 is supplied from the battery 12 and the output circuit of the tube includes the primary of a transformer 25.

The alternating current component of the output of the tube 20 is impressed through the transformer 25 on the grid 26 of the tube 27 of a vacuum tube relay, which includes also the tube 28. The grid 26 is negatively biased by the battery 29 and is provided with a resistance leak 30. Space current for the tube 27 is supplied by the battery 31 and the output circuit of this tube includes a resistance 32. Space current for the tube 28 is supplied by the battery 33 and the output circuit of this tube includes a resistance 34, the grid 26 of the tube 27 being connected to the output circuit of the tube 28 between the battery 33 and the resistance 34. The grid 35 of the tube 28 is connected through a biasing battery 36 and a resistance 37 with the output circuit of the tube 27 at a point between the battery 31 and the resistance 32. A power amplifier tube 38 has its grid 39 connected to the output circuit of the tube 27 between the battery 31 and the resistance 32. Space current for the tube 38 is supplied by the battery 12 and the output circuit of this tube includes the field winding of a relay 41.

The grid electrode 26 is properly biased so that, when the light responsive device 2 is steadily illuminated by the light beam, current will flow through the tube 27 and the grid 35 of the tube 28 is so biased that under such circumstances, current does not flow through the tube 28. The impulse produced by the interruption of the beam of light and amplified by the amplifier is impressed upon the grid 26. The bias voltage of the grid 19 of the tube 20 is so selected by means of the potentiometer 22 that the impulse resulting from the interruption of the beam by a vehicle traveling at less than a predetermined rate will not render the grid 26 of the tube 27 sufficiently negative to block the space current of the tube 27, but that the impulse resulting from the interruption of the beam by a vehicle traveling at or above the predetermined rate will render the grid 26 sufficiently negative to block the space current of the tube 27. The interruption of current flow through the resistance 32 changes the biasing of the grid 35 sufficiently to cause current flow in the tube 28 and also changes the biasing of the grid 39 to produce current flow in the tube 38, thereby energizing the relay 41 and closing the two sets of relay contacts. One set of contacts actuated by the armature of the relay 41 is connected in series with a battery 42, a condenser 43 in shunt to the resistance 37, and a resistance 44. The closing of this circuit charges the condenser 43, thereby restoring the negative bias to the grid 35 to stop the flow of space current through the tube 28 and effecting the rebiasing of the grid 39 to stop current flow through the tube 38. The length of time during which the relay is operative depends upon the time required to charge the condenser through the resistance 44. The second set of contacts actuated by the relay 41 serves to light the signal lamp 40 during the interval that the relay is operated.

An alternative arrangement to distinguish between small uniform bodies traveling above and below a predetermined speed may use a capacitance 7 shunted by a resistance 8, as in Fig. 4, instead of the inductance 6, shown in Fig. 3. A beam of light is directed from a source 1 as in Fig. 1, across the path along which the bodies are traveling, and is directed at the photo-electric cell 2. In front of the photo-electric cell there is provided a diaphragm 3 (Fig. 4) having a horizontal slit 4 of substantially the same width in the direction of motion as the moving body and a lens 11. As the edge of the body 5 traverses the beam, it decreases the light received by the photo-electric cell at a rate depending on the speed of the body until the light is practically cut off, and immediately thereafter it increases the light received by the photo-electric cell at the same rate. During this time interval, therefore, the current through the photo-electric cell decreases and then increases, at a rate depending on the speed of the body. As previously described, this causes the voltage across the capacitance 7 to decrease, and then to increase, so that the minimum value of voltage occurring across the capacitance is determined by the speed of passing of the moving body.

This voltage impulse is impressed upon the terminals 9 and 10 of Fig. 3 of a circuit substantially identical with that used with the inductance 6. The control electrode 14 of the first tube 15 of the two tube amplifier is positively biased through the resistance leak 16 by the battery 12, instead of being negatively biased as before. The remaining connections are identical in the two cases, and the operation of the circuit is also the same, with the exception that the voltage impulse applied to the grid electrode 26 is now greater for bodies that interrupt the beam of light at low speeds than it is for bodies that interrupt the beam of light at higher speeds. Thus, the two-tube vacuum tube relay consisting of the tubes labelled 27 and 28 will operate for lower speeds in the same manner as it operated for higher speeds when arranged as in Fig. 3 with the inductance 6. Thus, the signal lamp 40 will indicate the passage of a body at a speed below the predetermined speed, with this arrangement; whereas previously the signal lamp 40 indicated the passage of a body at a speed above the predetermined speed.

It is of course understood that the invention may be utilized in numerous other ways than herein disclosed and that various changes may be made without in any way departing from the spirit of the invention as defined in the appended claims. The invention may be adapted for use in the determination of the speed of any moving body and the extent of the invention is to be understood to be limited only by the scope of the claims.

We claim:

1. In a device of the character described, a circuit including a unit sensitive to radiant energy, means for directing a beam of radiant energy to said unit, said beam being adapted to be traversed by an object whose speed is to be measured, and means in said circuit for producing a single voltage impulse having its magnitude in constant ratio to the rate of change of current flow in the circuit, the relation of said beam and object being such that the energy acting on the unit during passage of the edge of the object across the beam varies at an approximately constant rate proportional to the speed of the object.

2. In a device of the character described, a circuit including a unit sensitive to radiant energy, means for directing a beam of radiant energy to said unit, said beam being adapted to be traversed by an object whose speed is to be measured, means in said circuit for producing a single voltage impulse having its magnitude in constant ratio to the rate of change of current flow in the circuit, and means responsive in a predetermined manner to impulses of predetermined magnitude, the relation of said beam and object being such that the energy acting on the unit during passage of the edge of the object across the beam varies at an approximately constant rate proportional to the speed of the object.

3. In a device of the character described, a circuit including a light sensitive unit, means for directing a light beam to said unit, said beam being adapted to be traversed by an object whose speed is to be measured, and means in said circuit for producing a single voltage impulse having its magnitude in constant ratio to the rate of change of current flow in the circuit, the relation of said beam and object being such that the energy acting on the unit during passage of the edge of the object across the beam varies at an approximately constant rate proportional to the speed of the object.

4. In a device of the character described, a circuit including a light sensitive unit, means for directing a light beam to said unit, said beam being adapted to be traversed by an object whose speed is to be measured, means in said circuit for producing a single voltage impulse having its magnitude in constant ratio to the rate of change of current flow in the circuit, and means responsive in predetermined manner to impulses of predetermined magnitude, the relation of said beam and object being such that the energy acting on the unit during passage of the edge of the object across the beam varies at an approximately constant rate proportional to the speed of the object.

5. In a device of the character described, a circuit including a unit sensitive to radiant energy, means for directing a beam of radiant energy to said unit, said beam being adapted to be traversed by an object whose speed is to be measured, and means in said circuit for producing a single voltage impulse having its magnitude responsive to the time required for an edge of the object to traverse the beam, the relation of said beam and object being such that the energy acting on the unit during passage of the edge of the object across the beam varies at an approximately constant rate proportional to the speed of the object.

6. In a device of the character described, a circuit including a unit sensitive to radiant energy, means for directing a beam of radiant energy to said unit, said beam being adapted to be traversed by an object whose speed is to be measured, means in said circuit for producing a single voltage impulse having its amplitude responsive to the time required for an edge of the object to traverse the beam, and means responsive in a predetermined manner to impulses of predetermined magnitude, the relation of said beam and object being such that the energy acting on the unit during passage of the edge of the object across the beam varies at an approximately constant rate proportional to the speed of the object.

7. In a device of the character described, a circuit including a light sensitive unit, means for directing a light beam to said unit, said beam being adapted to be traversed by an object whose speed is to be measured, and means in said circuit for producing a single voltage impulse having its magnitude responsive to the time required for an edge of the object to traverse the beam, the relation of said beam and object being such that the energy acting on the unit during passage of the edge of the object across the beam varies at an approximately constant rate proportional to the speed of the object.

8. In a device of the character described, a circuit including a light sensitive unit, means for directing a light beam to said unit, said beam being adapted to be traversed by an object whose speed is to be measured, means in said circuit for producing a single voltage impulse having its amplitude responsive to the time required for an edge of the object to traverse the beam, and means responsive in a predetermined manner to impulses of predetermined magnitude, the relation of said beam and object being such that the energy acting on the unit during passage of the edge of the object across the beam varies at an approximately constant rate proportional to the speed of the object.

9. In a device of the character described, a circuit including a unit sensitive to radiant energy and an inductance, said circuit being operative to produce a single voltage impulse having its magnitude in constant ratio to the rate of change of current flow in the circuit, means for directing a beam of radiant energy to said unit, said beam being adapted to be traversed by the object whose speed is to be measured, means responsive in a predetermined manner to impulses of predetermined magnitude, and means to impress on said last named means voltage impulses produced across said inductance, the relation of said beam and object being such that the energy acting on the unit during passage of the edge of the object across the beam varies at an approximately constant rate proportional to the speed of the object.

10. In a device of the character described, a circuit including a light sensitive unit and an inductance, said circuit being operative to produce a single voltage impulse having its magnitude in constant ratio to the rate of change of current flow in the circuit, means for directing a light beam to said unit, said beam being adapted to be traversed by the object whose speed is to be measured, means responsive in a predetermined manner to impulses of a predetermined magnitude, and means to impress on said last-named means voltage impulses produced across said inductance, the relation of said beam and object being such that the energy acting on the unit during passage of the edge of the object across the beam varies at an approximately constant rate proportional to the speed of the object.

11. In a device of the character described, a circuit including a unit sensitive to radiant energy and a capacitance, means for directing a beam of radiant energy to said unit, said beam being adapted to be traversed by the object whose speed is to be measured, said circuit being operative to produce a single voltage impulse having its magnitude inversely proportional to the time required for the object to intercept the beam, means responsive in a predetermined manner to impulses of predetermined magnitude and means to impress on said last-named means voltage impulses produced across said capacitance, the relation of said beam and object being such that the energy acting on the unit during passage of the edge of the object across the beam varies at an approximately constant rate proportional to the speed of the object.

12. In a device of the character described, a circuit including a light sensitive unit and a capacitance, means for directing a light beam to said unit, said beam being adapted to be traversed by the object whose speed is to be measured, said circuit being operative to produce a single voltage impulse having its magnitude inversely proportional to the time required for the object to intercept the beam, means responsive in a predetermined manner to impulses of predetermined magnitude and means to impress on said last-named means voltage impulses produced across said capacitance, the relation of said beam and object being such that the energy acting on the unit during passage of the edge of the object across the beam varies at an approximately constant rate proportional to the speed of the object.

13. The method of measuring the speed of an object which comprises causing the object to traverse a beam of radiant energy so related to the object that during passage of the edge of the object across the beam, the intercepted portion of the beam varies at an approximately constant rate proportional to the speed of the object, producing a single electrical impulse having its amplitude responsive to the rate of interruption of the beam, and impressing said impulses upon a device responsive to the magnitude thereof.

14. The method of measuring the speed of an object which comprises causing the object to traverse a beam of radiant energy so related to the object that during passage of the edge of the object across the beam, the intercepted portion of the beam varies at an approximately constant rate proportional to the speed of the object, producing a single electrical impulse having its magnitude responsive to the time required to interrupt the beam, and impressing said impulses upon a device responsive to the magnitude thereof.

15. In a device of the character described, a circuit including a unit sensitive to radiant energy, means for directing a beam of radiant energy to said unit, said beam being adapted to be traversed by an object whose speed is to be measured, and means in said circuit for producing a single voltage impulse having its magnitude inversely proportional to the time required for an edge of the object to traverse the beam, the relation of said beam and object being such that th radiant energy acting on the unit during passage of the edge of the object across the beam varies at an approximately constant rate proportional to the speed of the object.

16. In a device of the character described, a circuit including a unit sensitive to radiant energy, means for directing a beam of radiant energy to said unit, said beam being adapted to be traversed by an object whose speed is to be measured, means in said circuit for producing a single voltage impulse having its magnitude inversely proportional to the time required for an edge of the object to traverse the beam, and means responsive in a predetermined manner to impulses of predetermined magnitude, the relation of said beam and object being such that the radiant energy acting on the unit during passage of the edge of the object across the beam varies at an approximately constant rate proportional to the speed of the object.

ABRAHAM EDELMAN.
CLARENCE G. STONE.